United States Patent [19]

Solomon et al.

[11] Patent Number: 5,209,798
[45] Date of Patent: May 11, 1993

[54] METHOD OF FORMING A PRECISELY SPACED STACK OF SUBSTRATE LAYERS

[75] Inventors: Allen L. Solomon, Fullerton; Wei H. Koh, Irvine; Alan E. Ingall, Costa Mesa, all of Calif.

[73] Assignee: Grumman Aerospace Corporation, Bethpage, N.Y.

[21] Appl. No.: 796,592

[22] Filed: Nov. 22, 1991

[51] Int. Cl.$^5$ .................. B32B 18/00; B32B 31/06
[52] U.S. Cl. ........................ 156/153; 156/89; 156/325; 264/58
[58] Field of Search ............ 156/89, 153, 325; 264/58

[56] References Cited

U.S. PATENT DOCUMENTS

| | | | |
|---|---|---|---|
| 3,400,210 | 9/1968 | Reimer | 174/69.5 |
| 3,436,604 | 4/1969 | Hyltin et al. | 317/101 |
| 4,304,624 | 12/1981 | Carson et al. | 156/630 |
| 4,320,438 | 3/1982 | Ibrahim et al. | 361/401 |
| 4,352,715 | 10/1982 | Carson et al. | 156/634 |
| 4,354,107 | 10/1982 | Carson et al. | 250/239 |
| 4,371,744 | 2/1983 | Badet et al. | 174/68.5 |
| 4,399,089 | 8/1983 | Mohri et al. | 264/58 |
| 4,403,238 | 9/1983 | Clark | 357/30 |
| 4,423,468 | 12/1983 | Gatto et al. | 361/404 |
| 4,525,921 | 7/1985 | Carson et al. | 29/577 C |
| 4,551,629 | 11/1985 | Carson et al. | 250/578 |
| 4,670,770 | 6/1987 | Tai | 357/60 |
| 4,740,414 | 4/1988 | Shaheen | 156/89 |
| 4,794,092 | 12/1988 | Solomon | 437/51 |
| 4,799,984 | 1/1989 | Rellick | 156/89 |
| 4,806,188 | 2/1989 | Rellick | 156/89 |
| 4,929,295 | 5/1990 | Kohno et al. | 156/89 |
| 4,978,052 | 12/1990 | Fister et al. | 156/325 |

Primary Examiner—Caleb Weston
Attorney, Agent, or Firm—Stetina and Brunda

[57] ABSTRACT

A precisely spaced stack of substrate layers comprises a plurality of substrate layers disposed one above another in a stacked configuration and having a glass layer coating on one of each pair of adjacent substrates, the glass layer having a thickness such that the sum of the thicknesses of the glass layer and the substrate to which the glass layer is fused is approximately equal for substantially all of the substrate layers. A polymer adhesive is disposed intermediate the glass layer and a substrate layer such that adjacent substrate layers are bonded together. By controlling the height of each pair of substrate and glass layers, a precisely spaced and strongly bonded stack of substrate layers is formed.

9 Claims, 4 Drawing Sheets $l_1 \neq l_2 \neq l_3$ $l_1 = l_2 = l_3$

METHOD OF FORMING A PRECISELY SPACED STACK OF SUBSTRATE LAYERS

FIELD OF THE INVENTION

The present invention relates generally to infrared detector arrays and more particularly to precisely spaced stacks of ceramic layers and a method for forming the same.

BACKGROUND OF THE INVENTION

The infrared spectrum covers a range of wavelengths longer than the visible wavelengths but shorter than microwave wavelengths. Visible wavelengths are generally regarded as between 0.4 and 0.75 micrometers. Infrared wavelengths extend from 0.75 micrometers to 1 millimeter. The function of an infrared detector is to respond to energy of a wavelength within some particular portion of the infrared region.

Heated objects will dissipate thermal energy having characteristic wavelengths within the infrared spectrum. Different levels of thermal energy, corresponding to different sources of heat, are characterized by the emission of signals within different portions of the infrared frequency spectrum. Detectors for highest efficiency are selected in accordance with their sensitivity in the range corresponding to the particular detection function of interest to the designer. Similarly, electronic circuitry that receives and processes the signals from the infrared detector must also be selected in view of the intended detection function.

A variety of different types of infrared detector have been proposed in the art since the first crude infrared detector was constructed in the early 1800's. Virtually all contemporary infrared detectors are solid state devices constructed of materials that respond to infrared energy in one of several ways. Electro-optical detectors, for example, respond to infrared energy by absorbing that energy, which causes electrical charge carriers to be generated. These carriers, in turn, can be detected by a change in the electrical properties of the material, such as a change in resistance. By measuring this change the infrared radiation can be derived. Advances in semiconductor materials and the development of highly sensitive electronic circuitry have advanced the performance of contemporary infrared detectors close to the ideal photon limit.

Current infrared detection systems incorporate arrays of large numbers of discrete, highly sensitive detector elements, the outputs of which are connected to sophisticated processing circuitry. By analyzing the pattern and sequence of detector element excitation, the processing circuitry can identify and monitor sources of infrared radiation.

Though the theoretical performance of such systems is satisfactory for many applications, it is difficult to actually construct structures that mate a million or more detector elements and associated circuitry in a reliable and practical manner. Consequently, practical applications for contemporary infrared detection systems have necessitated that further advances be made in areas such as miniaturization of the detector array and accompanying circuitry, minimization of noise intermixed with the electrical signal generated by the detector elements, and improvements in the reliability and economical production of the detector array and accompanying circuitry.

A contemporary subarray of detectors may, for example, contain 256 detectors on a side, or a total of 65,536 detectors, the size of each square detector being approximately 0.0035 inches on the side with 0.0005 inches spacing between detectors. Such a subarray would therefore be 1.024 inches on a side. Thus, interconnection of such a subarray to processing circuitry requires a connective module with sufficient circuitry to connect each of the 65,536 detectors to processing circuitry within a square, a little more than one inch on a side. The subarray may, in turn, be joined to form an on-focal plane array that connects to 25 million detectors or more. Considerable difficulties are presented in aligning the detector elements with conductors on the connecting module and in isolating adjacent conductors in such a dense environment.

The outputs of the detectors must undergo a series of electronic processing steps in order to permit derivation of the desired information. The more fundamental processing steps include preamplification, tuned bandpass filtering, clutter and background rejection, multiplexing and fixed noise pattern suppression. By providing a signal processing module that performs at least a portion of the processing functions within the module, i.e., on integrated circuit chips disposed adjacent the detector focal plane, the signal from each detector needs be transmitted only a short distance before processing. As a consequence of such on focal plane or up front signal processing, reductions in size, power and cost of the main processor may be achieved. Moreover, up front signal processing helps alleviate performance, reliability and economic problems associated with the construction of millions of closely spaced conductors connecting each detector element to the main signal processing network.

Infrared detectors are typically fabricated from single crystalline semiconductor wafers by photolithographic techniques and then bump bonded to signal processing modules. Each signal processing module is a stack of thin substrates which contain signal processing circuitry. Contact pads on one edge of a substrate are matched to a row of infrared detectors. A plurality of such modules may be stacked to form a subarray. A plurality of subarrays may then be assembled to form an infrared detector focal plane array.

A common problem encountered in stacking the substrates to form a module is in the alignment of the substrates. The spacing of the substrates in the stack must match the spacing between rows of detector elements.

Alumina ceramic is used extensively as the substrate. A glass adhesive between adjacent ceramic substrates in the module stack is preferred to maintain the substrate spacing for two reasons:

(1) In the case of an infrared imager that is operated at a cryogenic temperature it is highly desirable to have the coefficient of thermal expansion of the laminate adhesive close to that of the substrate to maintain the substrate spacing. A glass adhesive possesses a thermal coefficient close to alumina ceramic.

(2) A manufacturing process using a glass adhesive may consist of first screen printing a layer of glass paste onto the ceramic. After the paste solvent and other organics are evaporated and burned out, the glass is glazed by firing. This glass layer is ground to the required glass-plus-ceramic thickness, which matches the spacing between rows of detectors.

Glass coated substrates are conventionally stacked and then fired under pressure to bond the substrates together. This bonding, second firing process, however, can result in marginal adhesion from poor contact between the glass and the ceramic caused by voids, gaps or insufficient wetting. Raising the firing temperature to increase the flow of the glass or increasing the pressure are means of reducing these factors. However, these means can cause the glass to flow out of the stacked layers and so to reduce the glass layer thickness and to lose the required precise substrate spacing. Furthermore, gaps and voids in the glass layer present a difficulty in making patterned bonding pads on the face of the module where connection is made to the detector array.

Thus it would be desirable to provide a method to obtain the substrate spacing in the module stack that precisely matches the detector element spacing and simultaneously to obtain strong substrate adhesion.

SUMMARY OF THE INVENTION

The precisely spaced stack of substrate layers of the present invention comprises a plurality of substrate layers disposed one above another in a stacked configuration and having a glass layer fused to one of each pair of adjacent substrates, the glass layer having a thickness such that the sum of the thicknesses of the glass layer and the substrate to which the glass layer is fused is approximately equal for substantially all of the substrate layers. An ultrathin polymer adhesive layer is disposed intermediate each glass layer and adjacent substrate layer such that the substrate layers are bonded together. By controlling the height of each glass layer, a precisely spaced stack of substrate layers is formed.

To form the precisely spaced stack of substrate layers of the present invention a glass adhesive paste layer is disposed upon a first substrate layer. The first substrate layer is then heated to fuse the glass layer thereto. The thickness of the sum of the substrate and glass layers can be precisely controlled by grinding the glass layer to the desired overall thickness. Thus, the glass layer forms a coating or spacer of the height necessary to provide the desired overall thickness. After grinding, a thin polymer adhesive layer is disposed upon the glass coating to bond the glass coated substrate to another adjacent substrate layer. This process can be performed upon a plurality of substrate layers to form a stack. A fixture can be used to align the substrate layers, pressure is applied to the stack of substrate layers as the layers are being bonded together. Heat may be applied to hasten the curing of the adhesive.

The potential spacing error resulting from flow of the adhesive layer is much less than the potential spacing error resulting from glass flow which would otherwise occur if the stack were to be elevated to glass flow temperature according to contemporary practice. This is due to the approximately order of magnitude lower thickness of the adhesive layer relative to the glass layer. The polymer adhesive additionally supplies a stronger layer-to-layer bond than would otherwise result from a second glass-to-substrate fusion.

DETAILED DESCRIPTION OF THE PREFERRED EMBODIMENT

The detailed description set forth below in connection with the appended drawings is intended merely as a description of the presently preferred embodiment of the invention, and is not intended to represent the only form in which the present invention may be constructed or utilized. The description sets forth the functions and sequence of steps for the construction and implementation of the invention in connection with the illustrated embodiment. It is to be understood, however, that the same or equivalent functions and sequences may be accomplished by different embodiments that are also intended to be encompassed within the spirit and scope of the invention. Thus, although the following detailed description illustrates the use of the precisely stacked layers of the present invention in the construction of infrared detector subassemblies, those skilled in the art will recognize that various other, unrelated applications exist and are intended to be encompassed within the scope of this invention.

Figure 1:
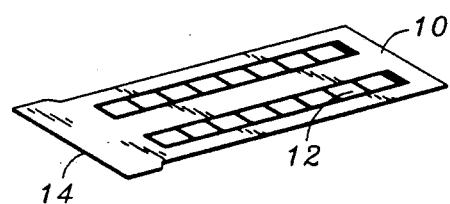
FIG. 1 is a perspective view of a prior art module having signal conditioning electronics disposed therein and having infrared detectors formed upon one edge thereof.

The precisely spaced stack of substrate layers of the present invention is illustrated in FIG. 1. The interface between layers in the present invention is illustrated in FIG. 4. FIGS. 5-10 illustrate a method for forming the precisely spaced stack of substrate layers and FIGS. 1-3 illustrate the prior art use of precisely stacked substrate layers in the construction of an infrared focal plane array.

Referring now to FIG. 1, a substrate or prior art infrared detector module 10 has a plurality of integrated circuits or signal conditioning electronics 12 disposed therein. An area array 14 of individual infrared detector elements is disposed upon an edge of the module.

Figure 2:
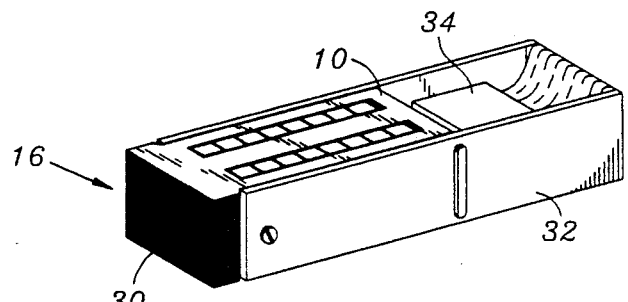
FIG. 2 is a perspective view of a plurality of modules such as those of FIG. 1 stacked together to form a prior art subarray.

Referring now to FIG. 2, a plurality of modules 10 (FIG. 1) may be stacked and optionally attached to a support structure 32 and further electronics 34 to form a subarray 16. Thus, a planar array 30 of infrared detector elements is formed upon one surface of the subarray 16. The individual arrays 14 (FIG. 1) of infrared detector elements must be properly aligned such that they define a common plane when assembled into the planar array 30 during the stacking process. Misalignment at any stage in assembly can result in distortion of the detected image. Proper alignment initially requires that the stacked substrate layers of modules 10 be precisely spaced.

Figure 3:
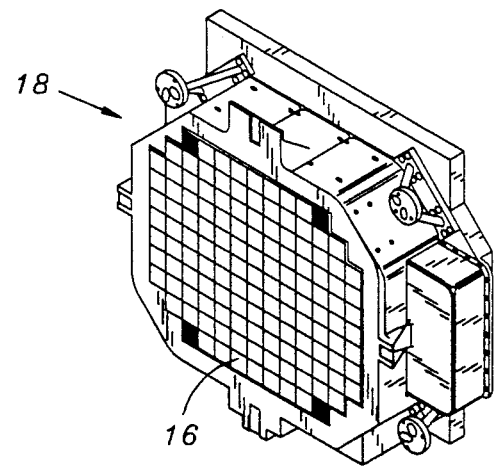
FIG. 3 is a perspective view of a plurality of subarrays such as those of FIG. 2 assembled to form a prior art focal plane array.
Figure 4:
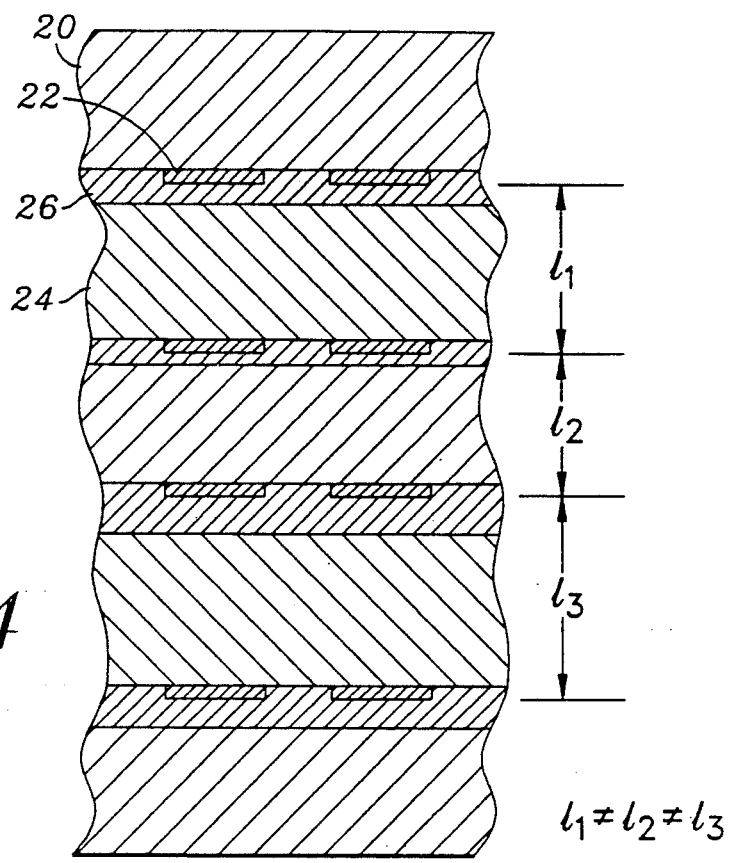
FIG. 4 is a cross-sectional side view of several layers in a stack formed according to the prior art.

Referring now to FIG. 3, a plurality of subarrays 16, shown at FIG. 2, may be assembled into a focal plane array 18 upon which infrared images may be focused. Such focal plane arrays are commonly used in satellite applications such as monitoring the earth's surface for infrared sources.

Referring now to FIG. 4, the layer-to-layer spacings, $l_2$, $l_2$ and $l_3$ are not necessarily equal due to flow of the glass material during the prior art fusion lamination process.

Figure 5:
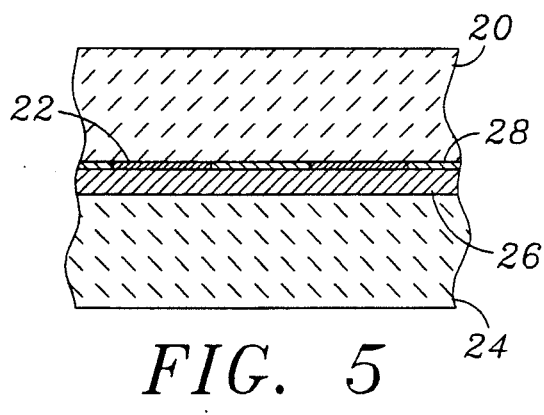
FIG. 5 is a cross-sectional side view of a portion of two adjacent substrate layers precisely spaced according to the method of the present invention.

Referring now to FIG. 5, a cross-sectional side view of a portion of a precisely spaced stack of substrate layers or modules of the present invention is depicted. The stack comprises two representative substrate layers 20 and 24, preferably of an alumina ceramic material, disposed in laminar juxtaposition and having intermediate spacer coatings or layers of glass 26 and a thin polymer adhesive 28 disposed therebetween. Thin film conductors or traces 22 may be formed upon one or both surfaces of either substrate layer 20 or 24. The conductors 22 are for conducting electronic signals from the detector elements 14 at FIG. 1 to the signal conditioning electronics 12 at FIG. 1, among the signal conditioning electronics 12, and from the signal conditioning electronics 12 to external circuitry 34 in FIG. 2.

The construction of modules is discussed in further detail in U.S. Pat. No. 4,659,931 issued to Schmitz et al. on Apr. 21, 1987, the entire contents of which are expressly incorporated by reference.

Referring now to FIGS. 6–11, a method of forming the precisely spaced stack of substrate layers of the present invention is illustrated. With particular reference to FIG. 5, an enlarged view of the first or upper substrate layer 20 of FIG. 4 is depicted.

Figure 7:
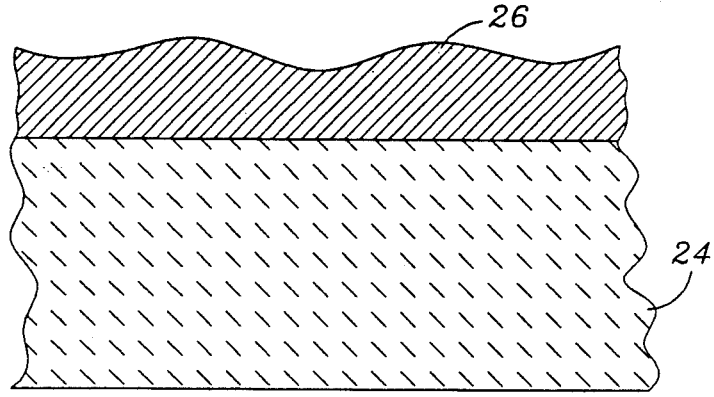
FIG. 7 is an enlarged cross-sectional side view of the lower substrate layer of FIG. 5 prior to grinding the glass layer.

With particular reference to FIG. 7, an enlarged view of the second or lower 24 substrate layer of FIG. 5 is depicted. A layer of glass paste has been screen printed or bladed onto the upper surface of the substrate layer 24. The glass paste is deposited such that its height or thickness after firing is in excess of that required to attain proper spacing of the substrate layers when stacked. A mask or patterned application may be utilized to assure that only the desired areas are covered by the glass layer. Thus, chip bonding pads and the like remain uncovered. The paste is then heated to remove organic materials and then fired to obtain glass layer 26.

Figure 8:
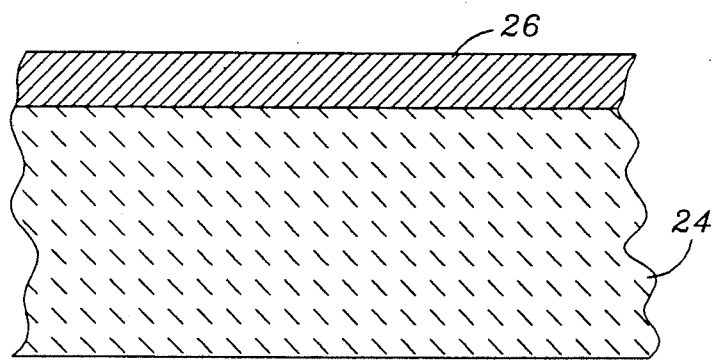
FIG. 8 is a cross-sectional side view of the lower substrate layer of FIG. 7 after grinding the glass layer to the desired thickness.

With particular reference to FIG. 8, the glass layer 26 has been reduced in height or thickness, preferably by grinding, such that the sum of the height of thickness of the substrate layer 24 plus the height or thickness of the glass coating layer 26 is substantially equal to the desired substrate layer spacing. Those skilled in the art will recognized that other means of reducing the height of the glass layer 26, e.g., lapping, etching, milling, are suitable. For the purposes of this application, the substrate layer spacing is defined as the distance between corresponding points, i.e., corresponding rows of detector elements, of adjacent substrate layers.

Figure 9:
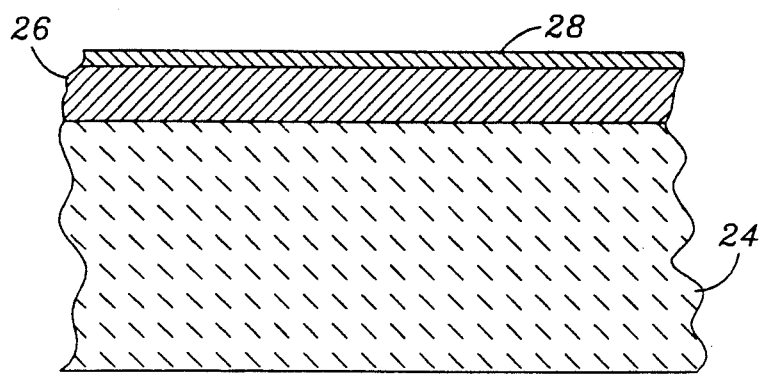
FIG. 9 is a cross-sectional side view of the lower substrate layer of FIG. 8 having a polymer adhesive disposed upon the upper surface of the ground glass layer.

With particular reference to FIG. 9, a polymer adhesive solution is disposed over the glass layer 26. A mask or patterned jet spray may be used to prevent the polymer from covering portions, e.g., chip bonding pads, of the substrate layer 24 as desired. The polymer solution is dried and baked to remove solvents therefrom but not to cure the adhesive. This layer 28 is a so-called B-staged polymer adhesive.

Figure 10:
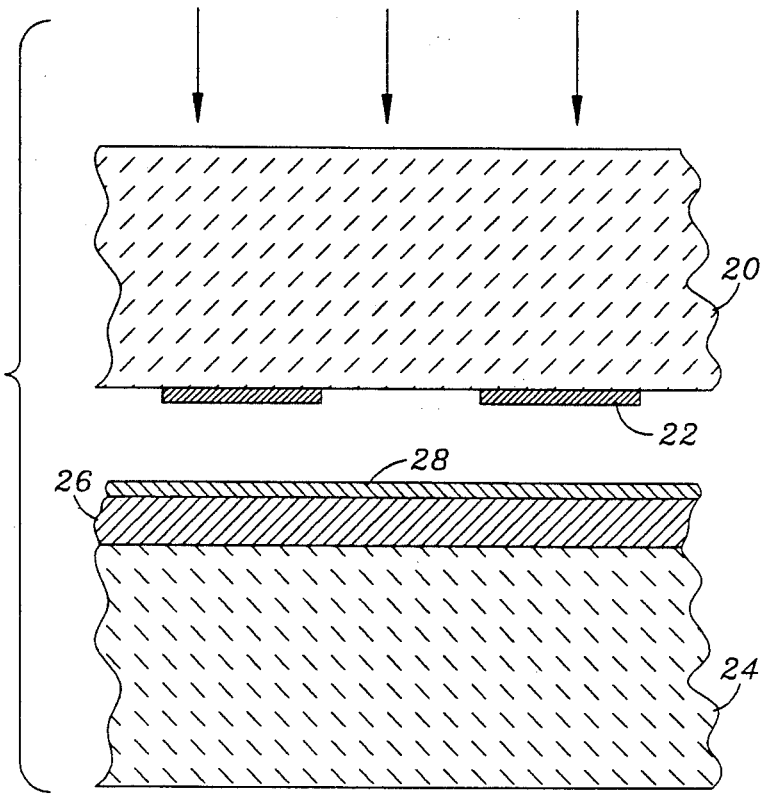
FIG. 10 is a cross-sectional side view of the upper layer of FIG. 6 and the lower layer of FIG. 9 showing the two layers positioned such that they may be bonded together.

With particular reference to FIG. 10, a plurality of layers may be positioned as illustrated and then stacked such that a module 10 such as that shown in FIG. may be formed. A laminating fixture may be utilized to facilitate alignment during stacking. The stack or the fixture with the stack may be placed in a hot press where pressure, preferably not to exceed 300 psi, is applied. The assembly may be heated, to cure the polymer adhesive. The cure temperature of the adhesive is below the softening point of the glass so that during the stacking assembly the glass remains incompressible. This insures that the layer thickness, hence the space between the adjacent layers, remain unaltered.

Figure 11:
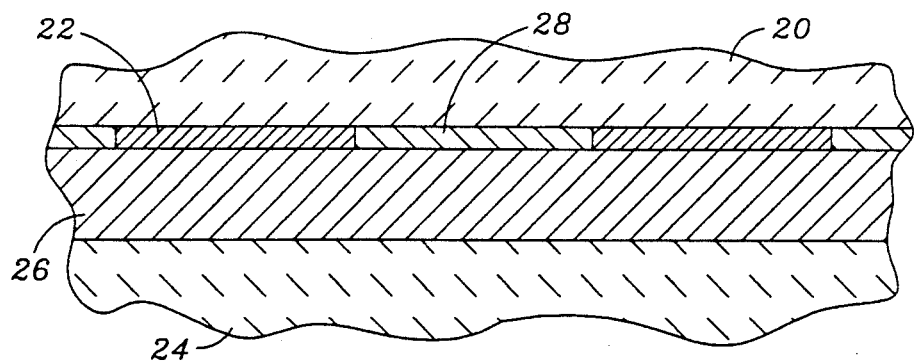
FIG. 11 is an enlarged cross-sectional side view of the glass and polymer adhesives of FIG. 5 disposed on intermediately adjacent substrate layers.

With particular reference to FIG. 11, the process of forming a precisely spaced stack of substrate layers of the present invention provides a stack of substrate layers wherein the distance between adjacent layers 20 and 24 is substantially equal to the sum of the substrate thickness and the height or thickness of the glass layer 26. Since the polymer layer is approximately one-tenth as thick as the glass, it contributes very little in height or thickness. Since the height or thickness of the glass layer 26 can be precisely controlled, the layer spacing can likewise be precisely controlled.

Figure 12:
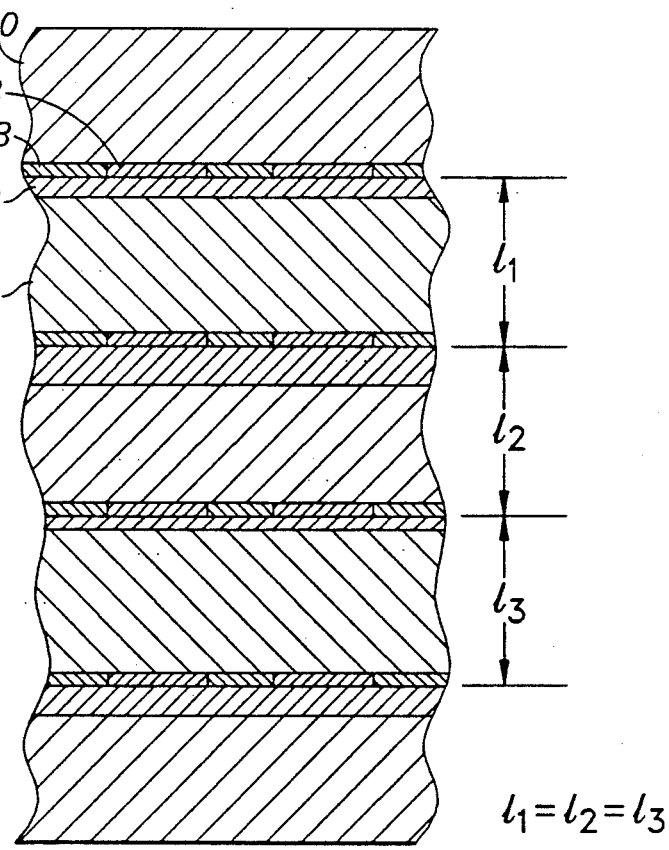
FIG. 12 is a cross-sectional view of several layers in a stack formed according to the present invention.
Figure 6:
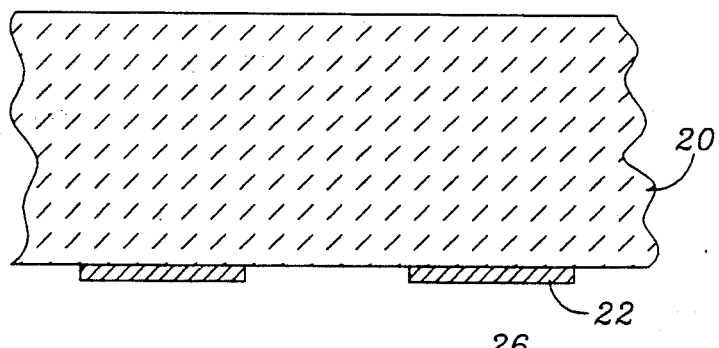
FIG. 6 is an enlarged cross-sectional side view of a portion of the upper substrate layer of FIG. 4.

Referring now to FIG. 12, the combined glass and substrate thickness is not altered during stack lamination. The resulting layer-to-layer spacings $l_1$, $l_2$ and $l_3$ are much more consistent than in the prior art (FIG. 4).

It is understood that the exemplary precisely spaced stack of substrate layers and method for forming the same of the present invention described herein and shown in the drawings represents only the presently preferred embodiment thereof. Indeed, various modifications and additions may be made to such embodiment without departing from the spirit and scope of the invention. For example the substrate layers need not be detector modules as described herein, but rather may be any substrate layers where precise stacking is desired. Indeed, the present invention need not be limited to semiconductor applications, but rather may find application in a variety of fields. Thus, these and other modifications and additions may be obvious to those skilled in the art and may be implemented to adapt the present invention for a variety of different applications.

We claim:

1. The method of forming a precisely spaced stack of substrate layers such that detector elements disposed upon the edge portions of the layers will be precisely aligned to form a detector array, the method comprising the steps of:
    (a) forming a first glass coating upon the top surface of a first substrate layer;
    (b) removing a portion of said first glass coating such that the sum of the thicknesses of said first substrate layer and said first glass coating is a desired thickness;
    (c) disposing an adhesive layer upon said first glass coating;
    (d) forming a second glass coating upon the top surface of a second substrate;

(e) removing a portion of said second glass coating such that the sum of the thickness of said second substrate layer and said second glass coating is a desired thickness;

(f) disposing the bottom surface of said second glass coated substrate layer upon said adhesive layer;

(g) curing said adhesive layer to bond said first and second substrate layers together, using a curing temperature below said glass coating fusion temperature such that said glass layer does not soften;

(h) whereby the presence of said adhesive layer permits bonding of the stacked substrate layers without the need to heat the substrate layers to glass fusion temperatures, thereby avoiding intersubstrate layer spacing inconsistencies resulting from glass flow and also avoiding gaps and voids in the glass.

2. The method of forming a precisely spaced stack of substrate layers as recited in claim 1 wherein:

(a) the step of disposing a first glass coating upon a first substrate layer comprises disposing a first glass coating upon a first ceramic layer; and (b) the step of disposing an adhesive layer upon said first glass coating comprises disposing a polymer layer upon said first glass coating.

3. The method of forming a precisely spaced stack of substrate layers as recited in claim 2 wherein the step of disposing a first glass coating upon a first substrate layer comprises disposing a glass adhesive paste upon a first substrate layer.

4. The method of forming a precisely spaced stack of substrate layers as recited in claim 3 wherein the step of disposing a first glass coating upon a first substrate layer comprises silk screening a glass adhesive layer upon said first substrate layer.

5. The method of forming a precisely spaced stack of substrate layers as recited in claim 2 wherein the step of disposing a polymer layer upon said first glass coating comprises spraying a polymer layer solution upon said first glass coating.

6. The method of forming a precisely spaced stack of substrate layers as recited in claim 1 wherein the step of disposing a second glass coated substrate layer upon said adhesive layer comprises:

(a) placing said first and second substrate layers into a fixture such that said second substrate layer is stacked above said adhesive layer and said first substrate layer:

(b) heating said stacked layers to a temperature sufficient to cause said adhesive layer to bond said first and second substrate layers together; and (c) applying approximately 300 pounds per square inch of pressure to said first and second substrate layers as said first and second substrate layers are bonded together by said adhesive.

7. The method of forming a precisely spaced stack of substrate layers as recited in claim 6 wherein said substrate layers are heated to a temperature of between 300 and 500 degrees C. to cause said adhesive layer to bond said first and second substrate layers together.

8. The method of forming a precisely spaced stack of substrate layers as recited in claim 1 wherein the step of removing a portion of said glass coating comprises grinding said glass coating.

9. The method of forming a precisely spaced stack of substrate layers as recited in claim 3 further comprising the step of heating said first and second glass coated substrate layers prior to the step of disposing an adhesive layer upon said glass coated substrate layer to cause the removal of solvents and organic materials from said glass coatings.

* * * * *